(12) United States Patent
Roberts

(10) Patent No.: US 8,290,709 B2
(45) Date of Patent: *Oct. 16, 2012

(54) SYSTEM AND METHOD FOR IDENTIFYING INDIVIDUAL LOADS OF CHOPPED FORAGE IN STORAGE

(76) Inventor: Jeffrey S. Roberts, Hudson, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/195,946

(22) Filed: Aug. 2, 2011

(65) Prior Publication Data

US 2012/0029815 A1 Feb. 2, 2012

Related U.S. Application Data

(62) Division of application No. 11/789,102, filed on Apr. 24, 2007, now Pat. No. 7,996,134.

(51) Int. Cl.
*G01C 21/20* (2006.01)
*A01D 93/00* (2009.01)
*A01D 45/30* (2006.01)
*A01D 87/00* (2006.01)

(52) U.S. Cl. .................. 701/519; 701/50; 56/1
(58) Field of Classification Search .......... 701/50, 701/200, 207, 208, 213; 342/357.13; 171/1, 171/2; 56/10.2 B, 10.2 R; 340/439; 702/2, 702/5; 700/224, 225; 141/11, 12
See application file for complete search history.

(56) References Cited

U.S. PATENT DOCUMENTS

| | | | |
|---|---|---|---|
| 2001/0023766 A1 | 9/2001 | Ohtomo et al. | 172/4.5 |
| 2001/0029996 A1 | 10/2001 | Robinson | 141/11 |
| 2003/0182260 A1 | 9/2003 | Pickett et al. | 707/1 |
| 2006/0004484 A1 | 1/2006 | Hornbaker et al. | 700/225 |

FOREIGN PATENT DOCUMENTS

EP 1571515 A1 9/2005

*Primary Examiner* — Isam Alsomiri
*Assistant Examiner* — Ari M Diacou
(74) *Attorney, Agent, or Firm* — Skinner and Associates

(57) ABSTRACT

A system and methods for identifying individual loads of chopped forage in storage. Thus the field factors of crop, soil and harvest conditions that affect feeding quality or a quality analysis of the load can be associated with the forage as it is removed from storage and fed to livestock.

18 Claims, 4 Drawing Sheets

SYSTEM AND METHOD FOR IDENTIFYING INDIVIDUAL LOADS OF CHOPPED FORAGE IN STORAGE

CROSS REFERENCE TO RELATED APPLICATIONS

This application is a divisional application of U.S. patent application Ser. No. 11/789,102, filing date Apr. 24, 2007 now U.S. Pat. No. 7,996,134, status allowed, which is related to U.S. patent application Ser. No. 09/507,591, entitled "A System and Method for Identifying Bales of Hay" filed Jan. 24, 2006.

STATEMENT REGARDING FEDERALLY SPONSORED RESEARCH FOR DEVELOPMENT

Not Applicable.

THE NAMES OF PARTIES ON A JOINT RESEARCH AGREEMENT

Not Applicable.

DESCRIPTION

Background

One common technique for harvesting forage crops is to chop them with a mobile forage harvester in their field of origin at moistures between 40% and 70% harvested either by directly cutting the crop at that moisture, or by harvesting it from a pre-cut windrow that has dried to the target moisture range. The chopped forage is delivered into a transport vehicle normally capable of carrying between three and twenty tons of forage and transferred to the site of storage which is normally a pit or bunker structure. The forage is then dumped in a pile at the intake to the pit or bunker and then spread and packed with an implement that is normally a tractor equipped with a front blade for the purpose of distributing the forage in 2 inch to 10 inch thick layers so that it can be adequately packed for the exclusion of air. This packing and spreading method encourages fermentation of the forage for storage stability until it is later fed to livestock. The normal pit or bunker type of storage structure will hold between ten and five-hundred individual loads of forage.

The feeding properties, including digestibility and nutrient levels of the chopped forage varies from field to field and from area to area within an individual field. Many of the determining factors for the feeding properties of the forage can be measured at the time the crop is harvested including: the genetics of the crop; the soil type and fertility at the position the crop is removed from; the climatic conditions at the time of harvest and during the growing stages of the crop; the stage of maturity measured either by the duration since planting or the interval since the last harvest; and, the moisture content of the crop at the time of harvest. All of these factors can be associated with the areas of the field from where the forage is harvested and used as factors in calculating the feeding properties of the crop being harvested. Since a pit or bunker is filled from different fields and different areas within fields, the feeding properties of the forage placed in different areas and layers in the storage structure can vary significantly.

The production of milk from cows or the daily gain of beef cattle being fed is dependent on the nutritional quality of the feed ration of which forage is usually the dominant component. If values of the feeding properties of forage are known, they can be balanced with other components of the ration fed. The typical method for monitoring the feeding properties of the forage is to pull samples from the stored forage, send them to a lab and then adjust the levels of the other components to maximize the value of the forage in a cost-effective way. The effectiveness of this system is limited by: the number and frequency at which the samples are taken; the location from which the samples are taken and how that is matched up the actual forage as it is removed from the storage structure; and, the lag time associated with pulling the samples, sending them to a lab and waiting for the results.

In a prior invention, entitled "A system and method for identifying bales of hay", the forage crop harvested in bales is tracked from the field by attaching an identification device to the bale as disclosed in the prior invention. This method of identification is not possible when the forage is chopped, transported and spread as loose material.

Mapping using the Global Positioning System (GPS) is common place on a two dimensional basis (latitude and longitude) and is adequate for accurately determining the field position the crop is taken from. Three dimensional mapping using GPS technology, adding vertical position information to the map is also possible and used in applications such as mining and aviation where the additional position information is needed. In the system and method that has been invented, an improvement in identifying feed quality of the stored chopped forage by associating the field position of the crop's origin and the factors associated to location that impact quality, tracking that field position to the storage structure and then generating a 3 dimensional map of the storage structure that identifies the feed by its original field location as it is removed from the structure for feeding.

BRIEF SUMMARY OF THE INVENTION

A 2-dimensional map of the area covered by a forage harvester is generated using GPS mapping equipment while harvesting forage crop with a forage harvester. Factors affecting the feeding properties of that crop are associated with the map including but not limited to, soil fertility, crop variety, maturity of the crop, and weather conditions experienced during the growing and harvesting stages. When a transport vehicle is loaded with chopped forage from a forage harvester, the load is assigned a means of identification such as an identification number associating it with the field position covered by the harvest of the load. The identification number is communicated between the harvester and the transport vehicle. When the transport vehicle dumps the load of chopped forage at the storage structure, the identification number is again transmitted from the transport vehicle to a spreading implement and stored on a second device located on this implement. A three-dimensional map is generated as the spreading implement distributes the chopped forage using GPS tracking equipment mounted on the spreading implement. When the chopped forage is later removed for feeding, the removal device is equipped with a GPS receiver and the position of the chopped forage removed is tracked and recorded. Using the three-dimensional map the field position of the chopped forage removed can be identified and therefore the factors affecting quality of the forage related to its field position of origin are identified as the chopped forage is removed and fed. Alternatively, a sample can be pulled from each load before it is spread in the storage structure and the analysis of that sample can be associated with the individual loads.

DETAILED DESCRIPTION OF THE INVENTION

Figure 1:
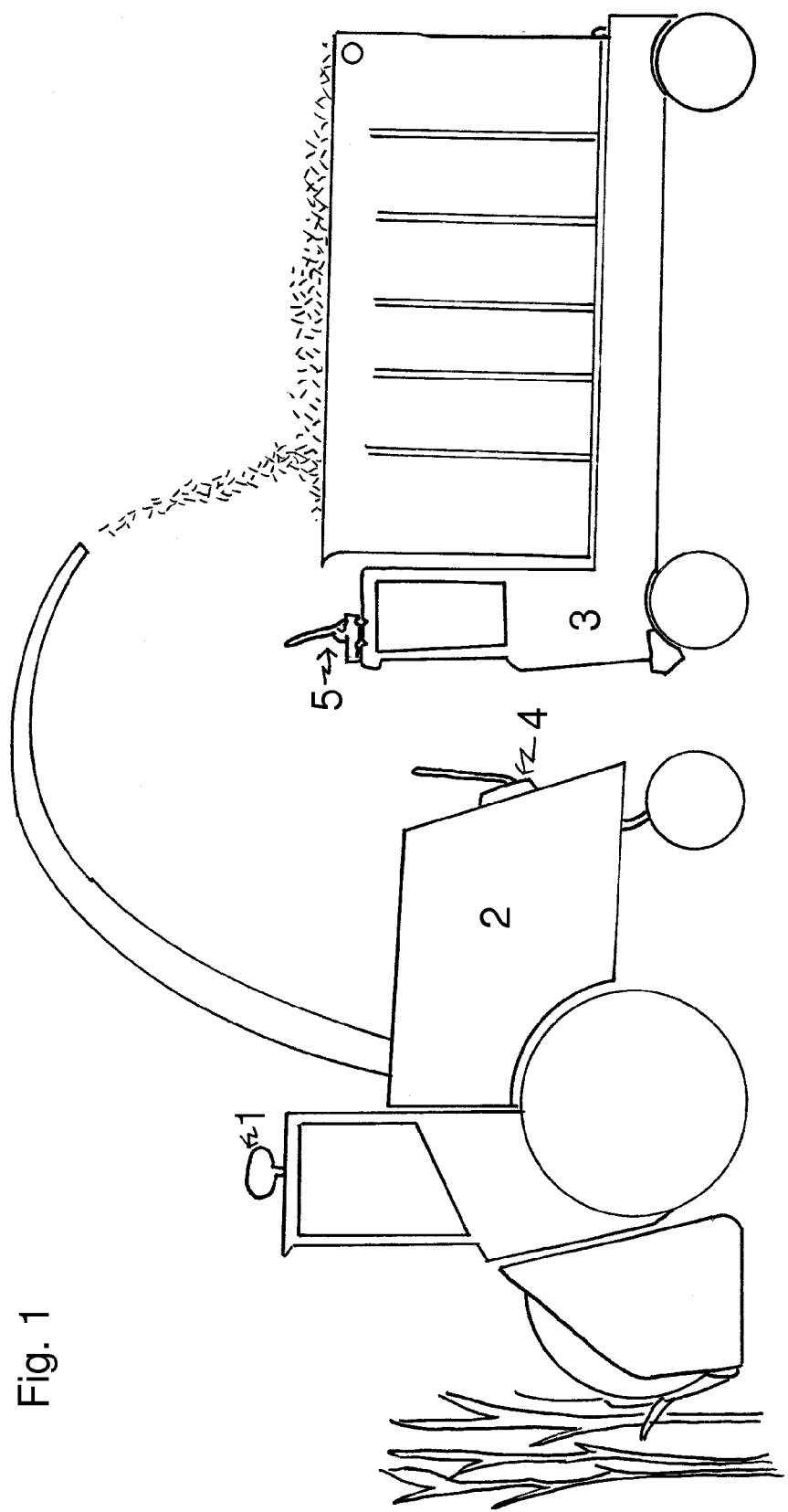
FIG. 1 shows the harvesting of the forage with a forage harvester equipped with GPS equipment and a radio transmitter or receiver, and the transfer of the forage to a transport vehicle equipped with a signal receiver and transmitter.
Figure 2:
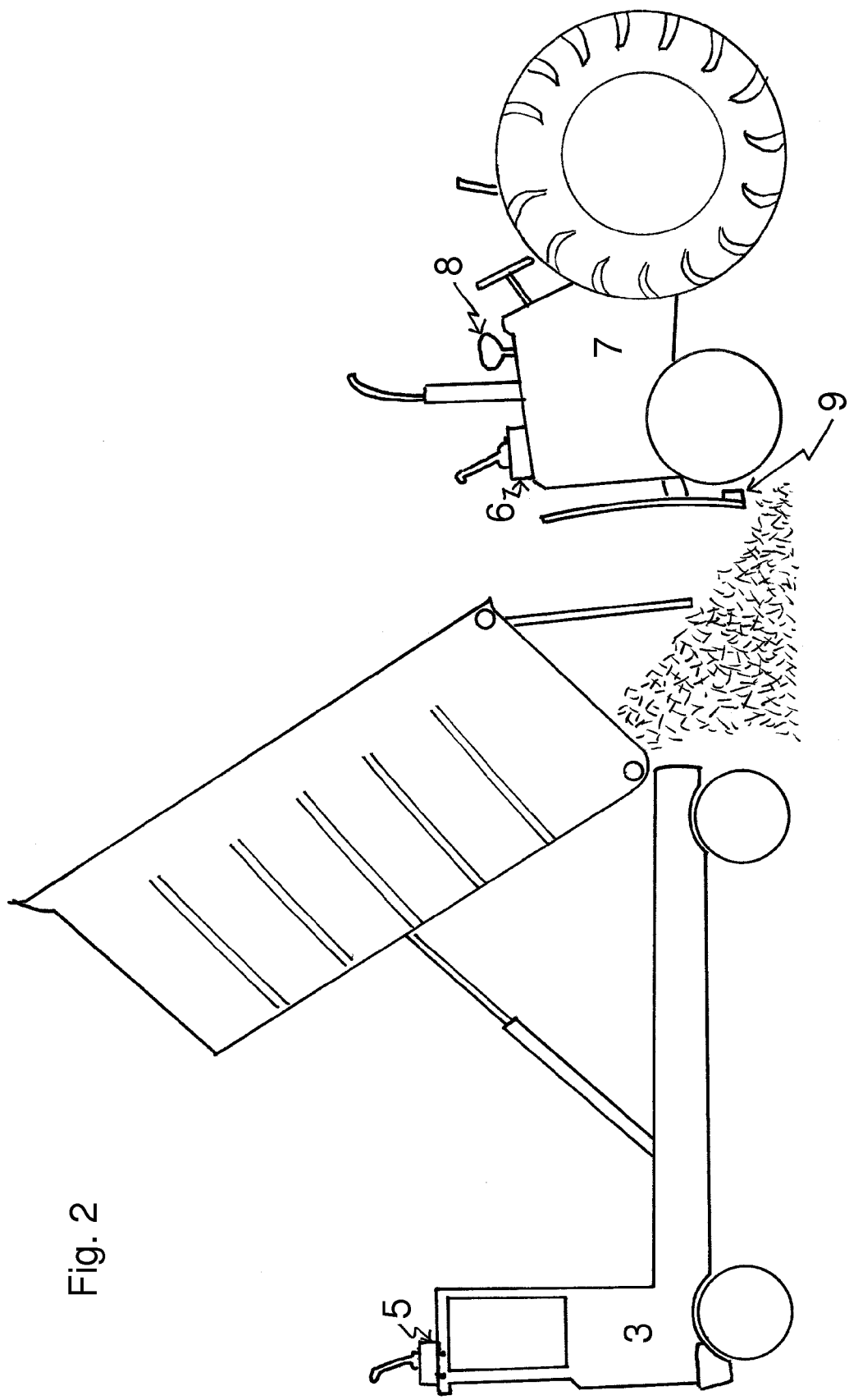
FIG. 2 shows the transport vehicle delivering forage to the storage site and the spreading and packing implement equipped with a signal receiver and a GPS recording device to measure the 3-dimensional position of the forage being placed in the storage structure.

The system and method that has been invented starts with the generation of a 2-dimentional map of fields of forage recording the information pertinent to the feeding properties of the crop. This information can include but is not limited to: the fertility level of the field attained from soil sampling using a grid sampling system; crop type identified by the records for planting and the varieties of seed used and then laid out on the map; climatic conditions during the growing of the crop recorded by field and transferred to the map; the maturity of the crop recorded by the interval of time between planting and harvesting, or in the case of crops that are harvested multiple times, the time between the last cutting and the current harvest; and the moisture of the forage as monitored at time of harvest. This information will be analyzed and used to estimate the feeding properties of the forage laid out on the 2-dimentional field map.

The next step in the system and method that has been invented is the collection of field position data using a GPS receiver 1-1 mounted on the forage harvester 1-2 as the forage is being harvested. The forage harvester delivers the chopped forage into a transport vehicle following it or a wagon it is pulling both of which are capable of carrying between three and twenty tons of forage and hereby referred to as a load. When the filling of a transport vehicle 1-3 begins, the position data is recorded for the load being filled. At the completion of filling for each individual load an identification number or other means of identifying the load is assigned to each load. The load identification is then transmitted via a radio signal transmitter 1-4 or other means on the forage harvester to a signal receiver on the transport vehicle 1-5. The load will now have an identification number that will reside on the transport vehicle in memory associated with the radio signal receiver. Since the transport vehicle is normally used for repeated loads, a new identification number is assigned to each new load. Alternatively, before the load is dumped at the storage site, a sample can be pulled from each load and analyzed for its feeding properties. This analysis can be associated with each individual load.

When the transport vehicle delivers the forage to the storage site, the identification number is transmitted via a radio signal from a transmitter 2-5 located on the transport vehicle 2-3 to a radio signal receiver 2-6 on the spreading and packing implement 2-7 which is normally a agricultural tractor with a front-end blade. The identification number is stored in memory associated with a GPS receiver located on the spreading and packing implement 2-7. As the packing and spreading implement pushes the load of chopped forage around in the storage structure, the 2-dimensional position of that implement is tracked by the GPS receiver 2-8 and associated with the identification number in the memory. A vertical position sensor 2-9 is located on the blade used to spread the forage and simultaneously to the tracking of the 2-dimensional position of the spreading and packing implement, the vertical position of the blade is tracked to determine the depth of chopped forage being spread. Alternatively, the vertical position sensor can be incorporated into the GPS receiver 2-8, but the accuracy of the vertical position will be a factor of the position of the blade in relation to the position of the GPS receiver and it may not be possible to locate the entire receiver on the blade due to space limitations. Now the memory on the packing and spreading implement has the recorded 3-dimensional position of the identified load. When a new load is delivered from the transport vehicle to the storage structure, the new identification number is transmitted to the packing and storage implement. The packing and spreading of one load must be completed before the next load is begun or separate tacking and spreading implements with the recording and tracking equipment can work individual piles separately. This data can be removed from the memory on the implement by transferring it to a removable storage device such as a flash drive or SD card, and used to generate a 3-dimensional map of all the loads placed in the storage structure.

Figure 3:
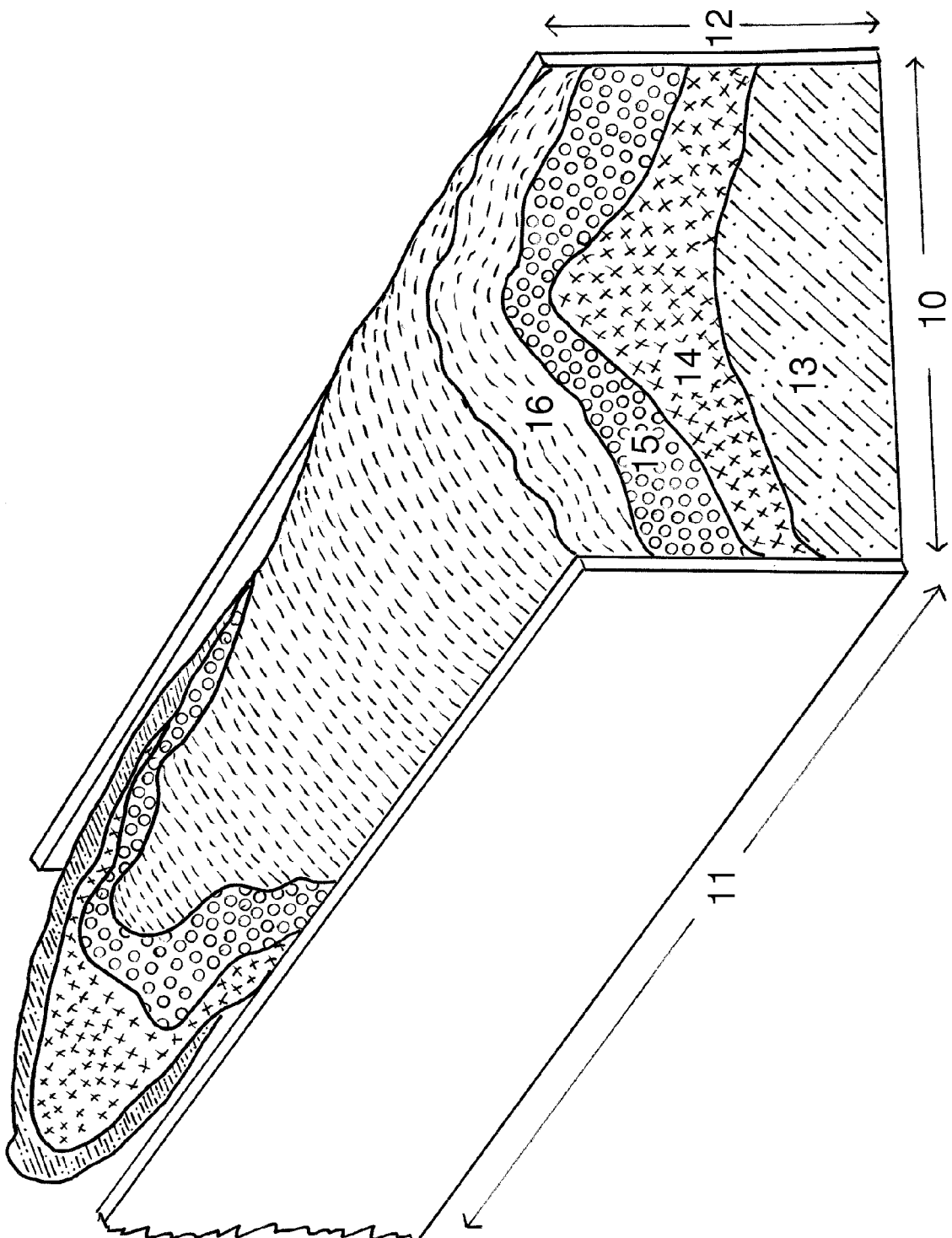
FIG. 3 shows the 3-dimensional map of the location of the forage with individual load identification numbers.
Figure 4:
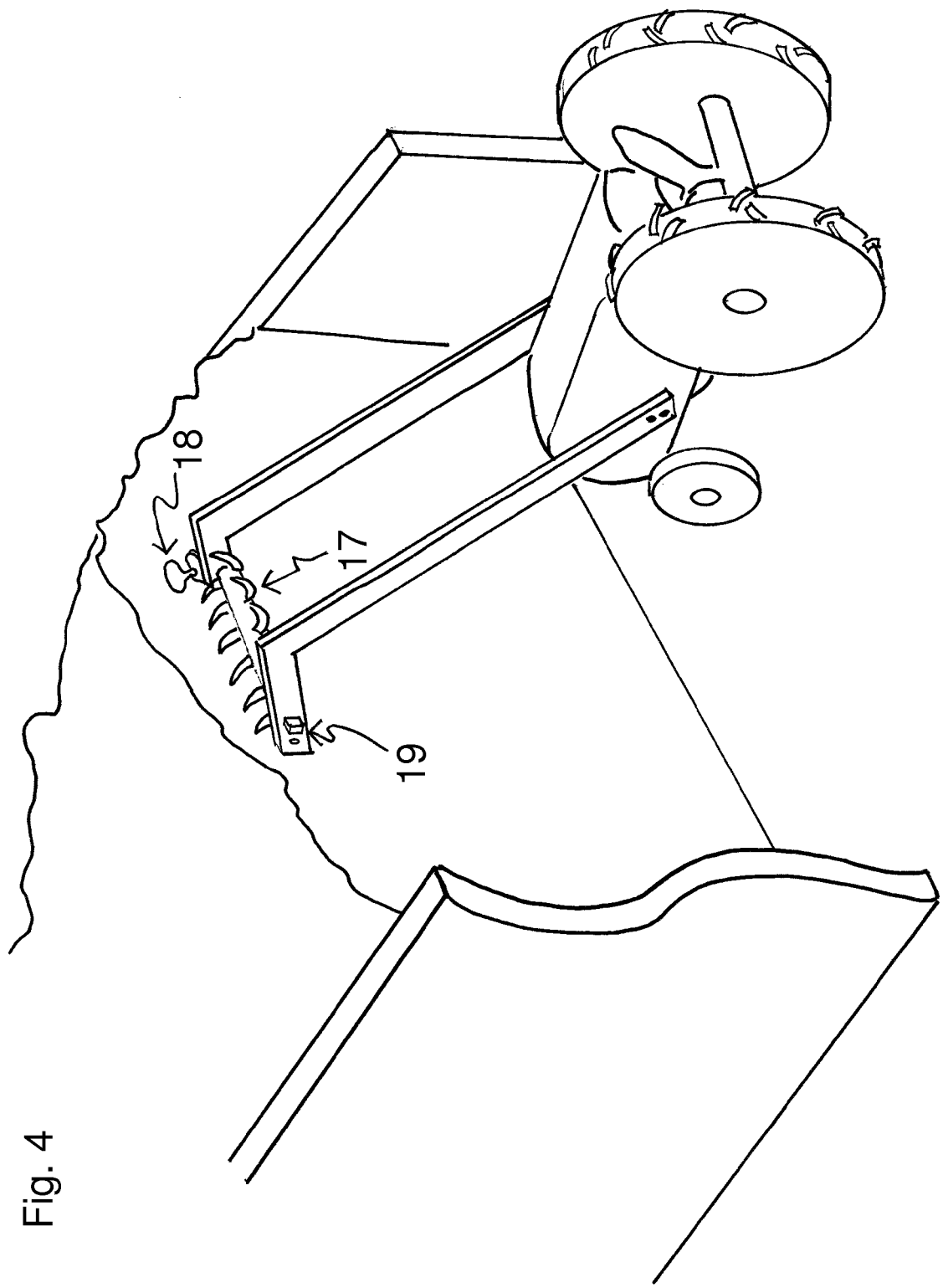
FIG. 4 shows the removal of forage from the storage structure with a device equipped with 3-dimensional position sensing equipment.

The resulting map FIG. 3, has a specific load identified in a region defined by horizontal coordinates 3-10 of latitude and 3-11 of longitude and a vertical coordinate 3-2 corresponding to the depth position of the load as it has been spread into the storage structure, represented as a 3-dimensional map with each individual load located 3-13, 3-14, 3-15, 3-16. This map is then cross-referenced with the properties of the load derived from the 2-dimensional map generated by the forage harvester at the time the load is taken from the field or with the sample analysis pulled from the load. The cross referencing can be done by a data processor located on the packing and spreading implement, or alternatively, it can be done by a data processor at a remote location such as an office computer.

When the forage is removed from the storage structure, a silage defacer 4-17 or similar device must be used in the process. The silage defacer is equipped with a GPS receiver 4-18 and a depth sensor 4-19 is located on the shaving devices. Using the horizontal position in terms of latitude and longitude together with the movement of the removal device both horizontally and vertically, the loads and amount of the loads which are being removed can be calculated by a processor located either on the shaving device or at a remote location such as an office computer. The factors associated with feeding quality can therefore be assigned to the forage as it is removed from the storage structure.

What is claimed:

1. A method for identifying forage in a storage structure on a load by load basis by the field position from where the forage was harvested comprising the steps of: identifying the field area a load of forage has been harvested from, transmitting the identification to a vehicle for transporting the identified load to a storage structure, transporting the identified load to the storage structure, transmitting the identification to a packing and spreading implement at the storage structure, tracking the horizontal movement of the packing and spreading implement as the identified load is moved into the storage structure; and monitoring the position in the storage structure the forage is removed by a forage removal device.

2. A system and method as in claim 1, where the identification associates feeding properties of each identified load based on factors known about the area of the field from where the load was harvested that influence those feeding properties.

3. A method as in claim 2 where the factors include the moisture of the forage crop.

4. A method as in claim 2 where the factors include the properties of the soil from the area of the field where the identified load originated.

5. A method as in claim 2 where the factors include the weather during harvest and during the growing of the crop in the area of the field where the identified load originated.

6. A method as in claim 2 where the factors include the time since planting or the time since the last harvest in the area of the field where the identified load originated.

7. A method as in claim 2 where the factors include the type of seed and days since establishment in the area of the field where the identified load originated.

8. A method as in claim 2 further comprising the step of tracking the vertical position of the packing and spreading implement as the identified load is moved into the storage structure so that the identification of the load can be associated vertically with the forage being removed.

9. A method as in claim 1 where the step of monitoring the position in the storage structure the forage is removed by the forage removal device involves both the horizontal and the vertical position in the storage structure.

10. A system for identifying forage in a storage structure on a load by load basis comprising an identification to uniquely identify each load of forage at the time of filling the load, a means to pull a sample of forage from the identified load and analyze it for its feeding properties, a signal transmitter connected to a harvester and a signal receiver connected to a vehicle transporting the identified load to a storage structure to transmit the identification and feeding property data from the harvester to the vehicle transporting the load to the storage structure, a signal transmitter connected to the vehicle transporting the identified load to the storage structure and a receiver connected to a packing and spreading implement to transmit the identification and feeding property data from the vehicle transporting the identified load to the packing and spreading implement, a means to track the horizontal movement and vertical position of the packing and spreading implement as the identified load is moved into the storage structure and a means, connected to a forage removal device, to monitor the position in the storage structure the forage is removed from by the forage removal device.

11. A system as in claim 10 where the means to track the horizontal movement and vertical position of the packing and spreading implement is a Global Positioning System and a vertical position sensor connected to the packing and spreading implement, and wherein the means to monitor the position in the storage structure the forage is removed from by the forage removal device is a Global Positioning System connected to the forage removal device.

12. A system as in claim 10, further comprising means to analyze the pulled sample on the harvester, and wherein the analyzed feeding property data is transmitted with the identification to the vehicle transporting the load to the storage structure.

13. A system as in claim 10, further comprising means to analyze the pulled sample apart from the harvester.

14. A method as in claim 1, further comprising the step of using the tracking data about the horizontal movement of the packing and spreading implement in the storage structure to generate a map of the identified load in the storage structure.

15. A method as in claim 14, further comprising a map of the field where the load of forage was harvested including information on factors that influence feeding properties of the forage such factors being selected from the group of factors consisting of: moisture of the forage crop at the time of harvest, properties of the soil, the weather during harvest and during the growing of the crop, the time since planting or the time since the last harvest, and the type of seed and days since establishment in the area of the field where the identified load originated, and wherein the map of the field is cross-referenced with the map of the load in the storage structure.

16. A method as in claim 14 wherein the map of the identified load in the storage structure is cross-referenced with a plurality of physical analysis of loads pulled before the step of packing and spreading the identified load at the storage structure.

17. A method as in claim 14, further comprising the step of calculating the feeding properties of forage being removed from the storage structure as it is being removed by the forage removal device.

18. A method as in claim 1, further comprising:
   a. a Global Positioning System and a vertical sensor connected to the packing and spreading implement which tracks the horizontal and vertical position of the identified load in the storage structure;
   b. a processor for processing GPS tracking data and vertical sensor data about the horizontal and vertical movement of the packing and spreading implement in the storage structure to generate a 3-D map of the identified load in the storage structure; and
   c. a 2-D map of the field where the identified load was harvested including information on factors that influence feeding properties of the forage, such factors being selected from the group of factors consisting of: moisture of the forage crop at the time of harvest, properties of the soil, the weather during harvest and during the growing of the crop, the time since planting or the time since the last harvest, and the type of seed and days since establishment in the area of the field where the identified load originated, d. wherein the 2-D map of the field is cross-referenced with the 3-D map of the load in the storage structure; and
   e. a processor for calculating the feeding properties of forage being removed from the storage structure as it is being removed by the forage removal device.

* * * * *